United States Patent [19]
Lewis

[11] Patent Number: 5,452,302
[45] Date of Patent: Sep. 19, 1995

[54] PROTOCOL FOR ASYNCHRONOUS CHARACTER COMMUNICATION

[75] Inventor: Ronald C. Lewis, Huntsville, Ala.

[73] Assignee: Motorola, Inc., Schaumburg, Ill.

[21] Appl. No.: 914,186

[22] Filed: Jul. 15, 1992

Related U.S. Application Data

[63] Continuation-in-part of Ser. No. 415,737, Oct. 2, 1989, abandoned.

[51] Int. Cl.[6] .............................................. H04J 3/00
[52] U.S. Cl. ................................................... 370/91
[58] Field of Search ................. 395/200; 370/91, 92, 370/94.1

[56] References Cited

U.S. PATENT DOCUMENTS

| | | | |
|---|---|---|---|
| 4,298,978 | 11/1981 | Nakamura | 370/92 |
| 4,494,194 | 1/1985 | Harris et al. | 364/DIG. 1 |
| 4,860,292 | 8/1989 | Newman | 371/32 |
| 4,947,317 | 8/1990 | DiGiulio | 364/200 |

*Primary Examiner*—Thomas M. Heckler
*Attorney, Agent, or Firm*—J. Ray Wood

[57] ABSTRACT

A first module (10) sends a message comprising a plurality of data characters to a second module (20) provided, however, that upon sending an individual data character, the first module waits to receive an acknowledgement character from the second module before proceeding to send another data character.

6 Claims, 1 Drawing Sheet

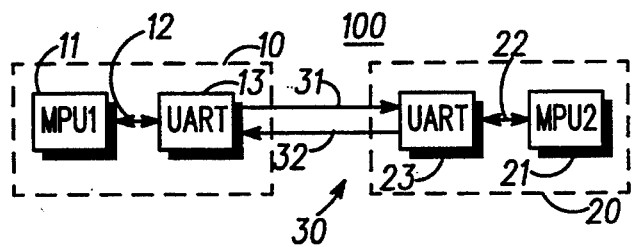
*FIG.1*
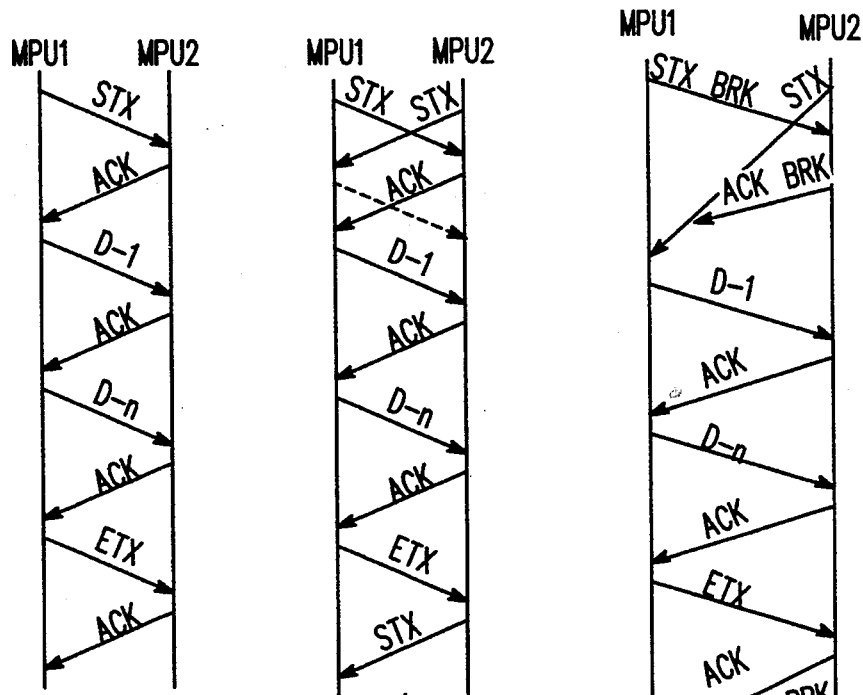
*FIG.2*  *FIG.3*  *FIG.4*

PROTOCOL FOR ASYNCHRONOUS CHARACTER COMMUNICATION

CROSS-REFERENCE TO RELATED APPLICATION

This is a continuation-in-part of prior application Ser. No. 07/415,737, filed Oct. 2 1989, abandoned, by Ronald C. Lewis, the same inventor as in the present application, which prior application is assigned to Universal Data Systems, Inc., the same assignee as in the present application, and which prior application is hereby incorporated by reference verbatim, with the same effect as though the prior application were fully and completely set forth herein.

FIELD OF THE INVENTION

This application relates to protocols including, but not limited to, a protocol for asynchronous character communication.

BACKGROUND OF THE INVENTION

This application is directed to asynchronous communication between computing systems and more specifically directed to a protocol utilizing one-way communication channels. As is known, a universal asynchronous receiver/transmitter ("UART") utilizes a separate communication channel for data transmission in each direction. Each communication channel consists of a single facility in which characters are transported as sequential bits. In this mode, start and stop bits define each character since no clock information is transported with the bits. Also, the UART stores one character while awaiting that character to be read by an associated microprocessor.

Although the UART provides the basic capability to asynchronously transmit and receive one character at a time, information may be lost if a received character is not read by the associated microprocessor before the next asynchronous character is received by the UART. One method of addressing this problem is to design the system to guarantee the time required to handle each received character is not exceeded by the transmitter. Another approach involves the use of additional control lines to provide acknowledgements that a received character has been read and, as a result, the next character may be transmitted. A still further approach utilizes a buffer having a capacity equal to the message length, in which each received character is stored.

The foregoing methods, however, have inherent disadvantages such as, for example, limiting the speed of communication by slowing the transmission rate, or imposing additional hardware requirements.

As a result, there is a need for an improved asynchronous character-oriented communication protocol.

SUMMARY OF THE INVENTION

In a communication system comprising a first module and a second module, the first module and the second module arranged for exchanging characters therebetween by means of a channel, and wherein certain characters are control characters, including start of message ("STX"), acknowledge ("ACK"), and end of text ("ETX"), and other characters are data characters, a method for the first module to asynchronously send a plurality of data characters comprising data character$_1$ ... data character$_n$ to the second module via the channel is disclosed. In accordance with the present invention, the method comprises the steps of:

(a) at the first module, sending STX to the second module;

(b) at the second module, upon receiving STX as in step (a), sending ACK to the first module;

(c) at the first module, upon receiving ACK as in step (b), sending individual data characters of the plurality of data characters to the second module, beginning with data character$_1$ and continuing to data character$_n$ provided, however, that upon sending a data character, the first module waits to receive an ACK from the second module before sending another data character;

(d) at the second module, receiving individual data characters of the plurality of data characters from the first module, beginning with data character$_1$ and continuing to data character$_n$ provided, however, that upon receiving a data character, the second module sends an ACK to the first module; and, (e) at the first module, sending ETX to the second module.

BRIEF DESCRIPTION OF THE DRAWINGS

FIG. 1 is a block diagram that shows a communication system 100 that is suitable for demonstrating a protocol for asynchronous character communication, in accordance with the present invention.

FIG. 2 is a sequence/response diagram illustrating a first embodiment of a protocol for asynchronous character communication, in accordance with the present invention.

FIG. 3 is a sequence/response diagram illustrating a second embodiment of a protocol for asynchronous character communication, in accordance with the present invention.

FIG. 4 is a sequence/response diagram illustrating a third embodiment of a protocol for asynchronous character communication, in accordance with the present invention.

DETAILED DESCRIPTION

FIG. 1 shows a communication system including a first module 10 and a second module 20, the first module and the second module being arranged for exchanging asynchronous characters therebetween by means of a channel 30.

Such characters, for instance, may be the seven-bit familiar American Standard Code for Information Interchange ("ASCII") characters, or else the eight-bit Extended Binary Coded Decimal Interchange Code ("EBCDIC") characters. As is known, both sets of asynchronous characters include certain characters as control characters, including start of message ("STX"), acknowledge ("ACK"), and end of text ("ETX"), and other characters as data characters. The following TABLE 1 presents the foregoing control characters in both ASCII and EBCDIC code formats:

TABLE 1

| Character | ASCII | EBCDIC |
|---|---|---|
| STX | 0000010 | 00000010 |
| ETX | 0000011 | 00000011 |
| ACK | 0000110 | 00000110 |

For example, in one embodiment the UART may be capable of sending 9-bit characters. In this embodiment, therefore, control characters have the 9th-bit set HIGH and user data characters have the 9th-bit set LOW. As a result, in this embodiment user data can utilize an 8-bit code without the necessity of reserving certain characters that only the protocol may use.

Still referring to FIG. 1, the module 10 includes a first microprocessor 11 (designated "MPU1") coupled to a first UART 13 by means of a channel 12, and the module 20 includes a second microprocessor 21 (designated "MPU2") coupled to a second UART 23 by means of a channel 22. Further, the channel 30 comprises a first half-duplex link 31 and a second half-duplex link 32. As shown, the first module 10's UART 13 is arranged for sending characters to the second module 20's UART 23 via the first link 31, and the second module 20's UART 23 is arranged for sending characters to the first module 10's UART 13 via the second link 32.

It will be appreciated that the first module 10 and the second module 20 each represent a computing system. It will further be appreciated that multiple communication lines exist between each UART and its associated microprocessor, represented by the channels 12 and 22.

FIG. 2 is a sequence/response diagram illustrating a first embodiment of a protocol for asynchronous character communication, in accordance with the present invention. As will be seen shortly, FIG. 2 depicts a method for the first module 10 to asynchronously send a plurality (n) of data characters to the second module 20 via the channel 30.

FIG. 2 depicts the transmission of a message from the first module 10 to the second module 20, and should be followed from top to bottom. As shown, the first microprocessor 11 initiates the communication to the second microprocessor 21 by causing UART 13 to transmit an STX command to UART 23 associated with the second microprocessor 21. In the interest of clarity, further references to UART 13 and/or UART 23 will be omitted, although it will be understood that the actual transmission and reception of control characters and data characters between the first microprocessor 11 and the second microprocessor 21 depend upon the proper functioning of the first UART 13 and the second UART 23, respectively.

Still referring to FIG. 2, upon receiving the STX control character, the second microprocessor 23 transmits ACK. Upon receiving the ACK, the first microprocessor 13 then sends a first data character designated D-1 to the second microprocessor 16 which, in acknowledgement thereof, sends a corresponding ACK. The foregoing sequence continues until the first microprocessor 11 sends the last data character designated D-n, which is received and acknowledged by the second microprocessor 21. The first microprocessor 13 then advises the second microprocessor 21 that the message is concluded by sending an ETX control character. The second microprocessor 21 then acknowledges receipt of ETX by returning an ACK control character, if the second microprocessor 21 does not have a message waiting to be sent. The communication session is thereby concluded.

In accordance with a protocol for asynchronous character communication, in accordance with the present invention, either microprocessor 11 or 21 can initiate a communication session consisting of an STX control character, followed by a plurality (n) of data characters, and terminated with an ETX control character. Moreover, the flow control of data characters is "character paced," that is, the sending microprocessor does not send the next data character until receiving an acknowledging ACK control character from the receiving microprocessor.

In one embodiment, the flow control of data characters is achieved by the first microprocessor 11 transmitting a single character at a time, and then waiting to receive an ACK from the second microprocessor 21 before continuing.

In another embodiment, the flow control of data characters is achieved by the first microprocessor 11 sending a predetermined number of data characters such as, for example, 2 or 3 data characters, to the second microprocessor 21, and then waiting to receive an ACK before continuing.

In either embodiment, regardless of the length of a message, the flow control of data characters thus prevents UART receiver overrun, provided the predetermined number of data characters sent before waiting for an ACK does not exceed the amount of buffering available in the UART receiver. The number of characters to be sent before waiting for acknowledgement is independent of the message size and is dependent on the size of the UART receiver buffer. Thus, the number of characters to be sent may be set as low as one (1) character, or as high as the character capacity of the UART receiver buffer.

Further, the control characters and data characters are sent over the same communication lines 31 and 32 and hence require no special or auxiliary lines for acknowledgements, commands, or timing signals.

FIG. 3 is a sequence/response diagram illustrating a second embodiment of a protocol for asynchronous character communication, in accordance with the present invention. As will be described below, there is illustrated the flow of communications when each microprocessor 11 and 21 contends to originate a message substantially at the same time.

Assume that the microprocessor 11 and the microprocessor 21 have sent an STX control character to each other sufficiently close in time such that neither processor receives the other processor's STX control character prior to generating its own STX control character. In this contention situation, one microprocessor is predefined as the "loser."

Referring still to FIG. 3, the second microprocessor 21 has been predefined to give precedence to the first microprocessor 11's initiating control character STX and, as a result, sends an ACK to the first microprocessor 11. The dotted line illustrates that the first microprocessor 11, as the winner of the contention, does not return an acknowledgement to the second microprocessor 21 when it has also originated an STX. The first microprocessor 11 then asynchronously sends data characters D-1 through D-n, which data characters are each individually acknowledged by the second microprocessor 21 as previously described with regard to FIG. 2.

To conclude the message transmission, the first microprocessor 11 sends ETX, which is received by the second microprocessor 21. However, instead of sending ACK, the second microprocessor 21 sends STX, since the second microprocessor 21 has a message waiting to be sent. Following receipt of ETX, the first microprocessor 11 thus accepts either STX or ACK as a valid reply.

The above transition is then followed by the transmission of data characters D-1 through D-n from the second microprocessor 21 to the first microprocessor 11.

The second microprocessor 21 then sends ETX. At this point, if the first microprocessor 11 has a message waiting to send to the second microprocessor 21, then the first microprocessor will respond to the ETX with an STX. Otherwise, if the first microprocessor 11 does not have a message waiting to send to the second microprocessor 21, then the first microprocessor will respond to the ETX with an ACK.

A protocol for asynchronous character communication, in accordance with the present invention, thus allows each microprocessor to alternately transmit messages to the other during a high message traffic period in which both microprocessors have messages to send, thereby preventing one microprocessor from being totally subservient to the other during such conditions.

TABLE 2 below contains a program listing which implements a protocol for asynchronous character communication, in accordance with the present invention, as software routines which are preferably incorporated in the operational software of the microprocessors 11 and 21.

TABLE 2

RECEIVE_DATA_ENQ returns true if a character has been received by the UART for processing.
RECEIVE_DATA is the last received character.
TX loads the character into the UART for transmission.
ERROR is an exception handler.
SEND_REQUEST is a variable set true by the upper level when it has a message to send.
DATA_TO_SEND_ENQ returns true if the upper level message has not been completely sent.
DATA_TO_SEND is the next character to send of the upper level message.
SEND_COMPLETE is used to notify the upper level the message has been sent and the protocol is available to send another.
LOSER returns true for one end and false for the other end of the protocol.
STATE is a variable.
STATE:   IDLE
    if RECEIVE_DATA_ENQ
        if RECEIVE_DATA == STX
            TX (ack)
            STATE = RECEIVE
        else
            ERROR
    else if SEND_REQUEST
        TX (stx)
        STATE = SEND
STATE:   SEND
    if RECEIVE_DATA_ENQ
    if RECEIVE_DATA == ack
        if DATA_TO_SEND_ENQ
            TX(DATA_TO_SEND)
            SEND_REQ = false
        else
            TX (etx)
            STATE = SEND_ETX
    IF RECEIVE_DATA == stx
        if LOSER
            TX (ack)
            STATE = RECEIVE
STATE:   SEND_ETX
    if RECEIVE_DATA_ENQ
        SEND_COMPLETE
        if RECEIVE_DATA == ack
            STATE = IDLE
        IF RECEIVE_DATA == stx
            TX (ack)
            STATE = RECEIVE
STATE:   RECEIVE
    if RECEIVE_DATA_ENQ
        if RECEIVE_DATA == data
            TX (ack)
        else if RECEIVE_DATA == ext
            if SEND_REQUEST
                TX (stx)
                STATE = SEND TABLE 2-continued else
            TX (ack)
            STATE = IDLE As depicted in TABLE 2 above, in the lowest level IF-ELSE nest within the STATE:IDLE routine, the label "ERROR" refers to a conventional error trapping routine located in the operational software which handles control when an error is detected. The term "upper level" in the definition of functions and variables refers to the operational software which controls other actions, including message control. The program listing is directed to protocol handling and is specified so as to permit it to be incorporated in a variety of operational software environments.

Some UART units will discard the latest-arriving characters in the case of UART overrun. To deal with this, a break signal, designated "BRK," may be introduced. The break signal is defined as the continuous presence of the space condition (logical zero) for a period of time longer than a character time. The UART must be able to test the condition of the line after a character is received to determine if the break condition exists on its receive line. This allows the UART to recognize the single case where overrun can occur. This can only occur when a message is begun and the pacing is per-character.

FIG. 4 is a sequence/response diagram illustrating a third embodiment of a protocol for asynchronous character communication, in accordance with the present invention. In this embodiment, the "winner" microprocessor sends BRK as the STX and the "loser" microprocessor sends BRK as the ACK reply to STX. FIG. 4 illustrates the same situation as FIG. 3 with the BRK modifications. Thus, the first microprocessor 11 and the second microprocessor 21 again have a contention situation. Furthermore, the second microprocessor 21 recognizes the situation and sends ACK before the first microprocessor 11 has processed its received STX. Since, under these conditions, the ACK is lost, the first microprocessor 11 must process STX, then check for the presence of the ACK BRK signal. If it is not present, the flow of communications will continue as in FIG. 3, above. Conversely, the presence of the ACK BRK signal is treated as ACK by the first microprocessor 11. The first microprocessor 11 then terminates the break signal, and sends data character D-1. When the second microprocessor 21 receives the D-1 character, it terminates the break signal and then sends ACK.

Thereafter, the flow of communications is the same as FIG. 3 until ETX is sent.

When the first microprocessor 11 sends ETX to conclude the message transmission, the second microprocessor 21 responds with ACK. However, before the first microprocessor 11 can process the received ACK, the second microprocessor 21 initiates a new message. As the current "winner," the second microprocessor 21 uses the break signal as STX. This allows the first microprocessor 11 to recognize the receiver overrun when it processes the received ACK. The first microprocessor 11 then responds with a break signal as ACK. The second microprocessor 21 then terminates sending of the break signal and sends data byte D-1. The first microprocessor 11 then terminates sending of the break signal and sends ACK. The remaining flow of communications is the same as FIG. 3.

While various embodiments of a protocol for asynchronous character communication, in accordance with the present invention, have been described hereinabove, the scope of the invention is defined by the following claims.

What is claimed is:

1. In a communication system comprising a first module and a second module, the first module and the second module arranged for exchanging characters therebetween by means of a channel, and wherein certain characters are control characters, including start of message ("STX"), acknowledge ("ACK"), and end of text ("ETX"), and other characters are data characters, a method for the first module to asynchronously send a plurality of data characters comprising data character$_1$ ... data character$_n$ to the second module via the channel, the method comprising the steps of:

(a) at the first module, sending STX to the second module;

(b) at the second module, upon receiving STX as in step (a), sending ACK to the first module;

(c) at the first module, upon receiving ACK as in step (b), sending individual data characters of the plurality of data characters to the second module, beginning with data character$_1$ and continuing to data character$_n$ provided, however, that upon sending a data character, the first module waits to receive an ACK from the second module before sending another data character;

(d) at the second module, receiving individual data characters of the plurality of data characters from the first module, beginning with data character$_1$ and continuing to data character$_n$ provided, however, that upon receiving a data character, the second module sends an ACK to the first module;

(e) at the first module, sending ETX to the second module; and (f) at the second module, upon receiving ETX as in step (e), sending a control character to the first module, the control character being ACK when the second module does not have a message to be sent to the first module, and the control character being STX when the second module does have a message to be sent to the first module.

2. The method of claim 1, wherein the channel comprises a first link and a second link, the first module arranged for sending characters to the second module via the first link, the second module arranged for sending characters to the first module via the second link.

3. The method of claim 2, wherein the first link and the second link are half-duplex.

4. In a communication system comprising a first module and a second module, the first module and the second module arranged for exchanging characters therebetween by means of a channel, and wherein certain characters are control characters, including start of message ("STX"), acknowledge ("ACK"), and end of text ("ETX"), and other characters are data characters, the first module and the second module further arranged for sending a continuous space condition ("BRK"), and wherein a space condition is equivalent to a logical zero value, a method for the first module to asynchronously send a plurality of data characters comprising data character$_1$ ... data character$_n$ to the second module via the channel, the method comprising the steps of:

(a) at the first module, sending a continuous space condition to the second module;

(b) at the second module, receiving the continuous space condition from the first module as in step (a), and thereupon sending a continuous space condition to the first module;

(c) at the first module, receiving the continuous space condition from the second module as in step (b), and thereupon ceasing to send the continuous space condition as in step (a), and thereafter sending individual data characters of the plurality of data characters to the second module, beginning with data character$_1$ and continuing to data character$_n$ provided, however, that upon sending a data character, the first module waits to receive an ACK from the second module before sending another data character;

(d) at the second module, receiving data character$_1$ from the first module as in step (c), and thereupon ceasing to send the continuous space condition as in step (b) and then sending ACK to the first module, and thereafter receiving individual data characters of the plurality of data characters from the first module, beginning with data character$_2$ and continuing to data character$_n$ provided, however, that upon receiving a data character, the second module sends an ACK to the first module;

(e) at the first module, sending ETX to the second module; and (f) at the second module, upon receiving ETX as in step (e), sending ACK when the second module does not have a message to be sent to the first module, and sending STX when the second module does have a message to be sent to the first module.

5. The method of claim 4, wherein the channel comprises a first link and a second link, the first module arranged for sending characters to the second module via the first link, the second module arranged for sending characters to the first module via the second link.

6. The method of claim 5, wherein the first link and the second link are half-duplex.

* * * * *